United States Patent [19]

Sonnek

[11] 4,351,493

[45] Sep. 28, 1982

[54] TAPE TENSION CONTROL FOR A TAPE RECORDER

[75] Inventor: Martin Sonnek, Vienna, Austria

[73] Assignee: U.S. Philips Corporation, New York, N.Y.

[21] Appl. No.: 183,501

[22] Filed: Sep. 2, 1980

[30] Foreign Application Priority Data

Sep. 20, 1979 [AT] Austria ............................ 6203/79

[51] Int. Cl.³ .................. B65H 59/38; G05B 5/00; G03B 1/04
[52] U.S. Cl. .................. 242/190; 242/75.51; 318/480
[58] Field of Search .............. 242/75.44, 75.3, 75.5, 242/75.51, 186, 187, 189, 190, 147 R; 318/6, 7, 480; 360/71, 73

[56] References Cited

U.S. PATENT DOCUMENTS 2,571,454 10/1951 Jones et al. ............................ 318/6
2,892,205 6/1959 Rich et al. ........................ 336/30 X

*Primary Examiner*—Leonard D. Christian
*Attorney, Agent, or Firm*—David R. Treacy

[57] ABSTRACT

A device for controlling tension in an elongated article arranged along a path, and a tape recording and/or reproducing apparatus including such a device, in which a control circuit influences the tension in the article, such as a tape, responsive to an electrical signal which is related to a moveable tension sensor. The electrical signal is varied by moving a metal part arranged as a damping element for a single coil only, so as to vary the quality factor (Q) of the coil.

13 Claims, 3 Drawing Figures

TAPE TENSION CONTROL FOR A TAPE RECORDER

BACKGROUND OF THE INVENTION

The invention relates to a recording and/or reproducing apparatus for a record carrier in the form of a tape, which apparatus comprises at least one tape-tension control; and more particularly to a tension control which comprises a tape-tension sensor which is movable against the action of a biasing force, such as from a spring, which sensor carries a tape guide along which the record carrier can be passed and which comprises a metal part which cooperates with at least one coil, which is energized with a signal voltage by means of an oscillator, the amplitude of the signal voltage being a measure of the instantaneous tape tension. The signal voltage is applied, or after being converted is applied to a control circuit of the tape tension control, which influences the tape tension.

In such apparatus, which is for example known from RADIO ELEKTRONIK SCHAU 1973, Vol. 8, pp. 454 and 455, the electromagnetic coupling between two coils is varied by a metal part which is inserted between the two coils and which is connected to the tape-tension sensor. One coil is an energized with a signal voltage by an oscillator, and the other coil supplies a signal voltage which is a measure of the actual tape tension, which signal voltage after rectification is applied to the control circuit of the tape tension control. Owing to the variable electrical coupling between the two coils, the amplitude of the signal voltage taken from the second coil will vary. The provision of two coils, which should be arranged in a specific geometric position relative to each other and between which the metal part of the tape-tension sensor is then inserted, is comparatively intricate and expensive.

SUMMARY OF THE INVENTION

It is the object of the invention to obviate the need for two coils or their relative positioning.

According to the invention, a device for controlling tension in an elongated article arranged along a path includes a single coil and the metal part takes the form of a damping element for the coil, the quality factor or Q of the coil being substantially variable depending on the displacement of the tape-tension sensor. In this way the desired result is obtained by means of a single coil, so that the entire construction is simple and cheap.

It is found to be advantageous if the coil is a hollow coil and the metal part is a plunger of a material which exhibits eddy-current and/or hysteresis losses, which plunger penetrates into the coil over a length which depends on the displacement of the tape-tension sensor. If for example only eddy current losses are to be used for damping the coil, copper may be employed as plunger material. However, it is found to be advantageous if the plunger is made of sheet-iron and is strip-shaped. By the use of sheet iron for the plunger both the eddy-current losses and the hysteresis losses produced in it are utilized for damping the coil, so that a distinct amplitude variation of the signal voltage is obtained depending on the instantaneous tape tension. Moreover, such a strip-shaped plunger is of very simple construction. In this respect it is also found to be advantageous for a simple construction if the tape-tension sensor comprises a support made of sheet iron which is integral with the plunger. Preferably, a deformable region is formed between the support and the plunger, via which the position of the plunger relative to the coil is adjustable by deformation. In this way the co-operation of the plunger with the coil can simply be adapted during manufacture.

Another suitable embodiment of the invention is characterized in that the metal part consists of a material with a good electrical conductivity, takes the form of a hollow cylinder and surrounds the coil for a greater or smaller part depending on the displacement of the tape-tension sensor. The metal part then functions a variable short-circuit ring for the coil, thus also enabling its damping to be varied.

It is found to be particularly advantageous if the coil is included in the oscillator as a circuit element which also determines its resonant frequency. In this way a separate coil for the oscillator may be dispensed with. Use is then also made of the fact that if the quality factor of the coil changes by influencing its damping the inductance of the coil does not change significantly, so that the resonant frequency of the oscillator will neither change significantly, which is of importance if this enables frequency-dependent influences in the control circuit to be avoided and the resonant frequency of the oscillator to be selected so as to ensure that no interference with other oscillators in the apparatus, such as the erase and/or bias oscillator or a pilot oscillator, occurs.

The invention will be described in more detail with reference to the drawings, which show some embodiments of the invention to which it is not limited.

DESCRIPTION OF THE PREFERRED EMBODIMENTS

Figure 1:
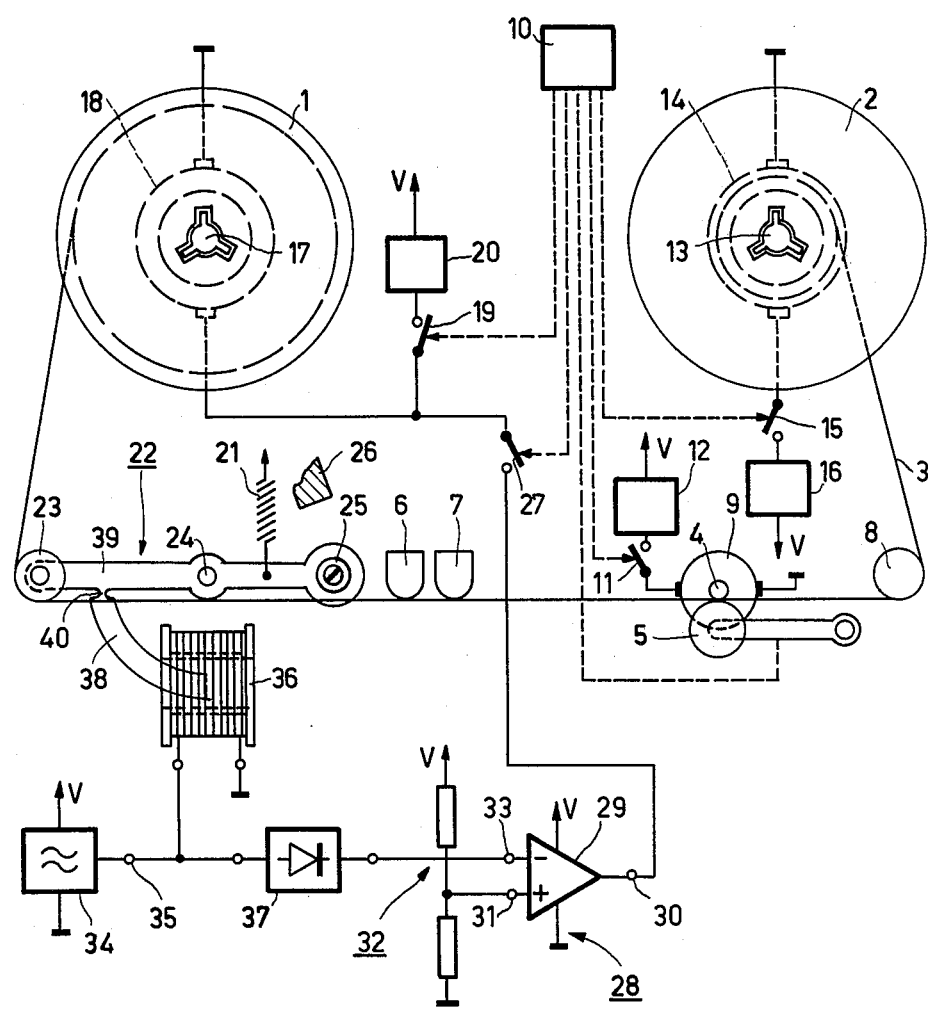
FIG. 1 is a combined diagrammatic view and electrical schematic diagram showing those parts of a recording and/or reproducing apparatus which are essential for the invention, in which apparatus the coil is damped by a sheet-iron plunger which penetrates into said coil.

In the recording and/or reproducing apparatus shown in FIG. 1 reels for a record carrier 3 in the form of a tape are designated 1 and 2. The record carrier extends between the two reels and is wound onto the one reel and unwound from the other reel during operation. For the RECORDING and PLAYBACK modes of the apparatus it is assumed that the reel 1 is the supply reel and the reel 2 the take-up reel. In these two modes of operation the record carrier 3 is driven with a predetermined tape speed during normal forward motion, for which purpose there is provided a capstan 4, against which the record carrier is pressed by means of a pressure roller 5. Before the record carrier 3, which is unwound from the reel 1, reaches the capstan 4 it is for example passed along two magnetic heads 6 and 7, of which the magnetic head 6 serves for erasing signals and the magnetic head 7 serves for recording and/or reproducing signals. After the capstan 4 the record carrier 3 is passed along a guide roller 8 to the reel 2.

For driving the capstan 4 there is provided a motor 9, which can be connected to a power-supply source 12 via a switch 11 which can be actuated by means of a control device 10 of the apparatus. The control device 10 also serves for actuating the pressure roller 5, in order to apply it to or lift it from the capstan 4. For winding the record carrier 3 onto the reel 2, the reel is non-positively connected to a winding spindle 13, which can be driven by a motor 14. The motor 14 is also switched on by means of a switch 15, which can be actuated by the control device 10 and is connected to a power-supply source 16. In a similar way the reel 1 is non-positively connected to a winding spindle 17, which can be driven by a motor 18, which in its turn can be connected to a power-supply source 20 via a switch 19 which can be actuated by the control device 10, which is effected if the record carrier 3 is to be wound onto the reel 1 during reverse motion.

As is known, it is of importance for such apparatus that, especially during normal forward motion of the record carrier in order to record or reproduce signals, the tape tension of the record carrier is as constant as possible in order to ensure correct recording or reproduction. This is generally effected by means of tape-tension controls, which comprise a tape-tension sensor 22, which is movable against the action of the spring 21 and which carries a tape guide 23 in the form of a roller or a pin, along which the record carrier is passed, so that depending on the instantaneous tape tension the tape-tension sensor assumes a different position. If the tape tension sensor takes the form of a lever which is pivotable about an axis 24, there is generally provided a counterweight 25 in order to balance the tape guide 23, which counterweight is arranged on the lever end that faces the tape guide 23. A stop 26 on the apparatus serves for limiting the travel of the tape tension sensor 22, if for example no record carrier runs along the tape guide 23. The instantaneous movement of the tape-tension sensor 22 is converted into an electric signal, which is applied to a control circuit, which in its turn influences the tape tension. This may be effected in a wide variety of manners, for example in that by means of a mechanical or electrical brake drag is exerted on the record carrier which is unwound from the reel 1 or the drive of the record carrier itself is influenced. By means of such a tape-tension control either the tape tension in the record carrier which is unwound from the reel 1 or the tape tension in the record carrier which is wound onto the reel 2 can be influenced. However, there may also be provided two such tape tension controls. There are numerous versions, which are known from the prior art.

In the present embodiment there is provided a tape tension control which measures the tape tension in the record carrier which runs off the reel 1 by means of the tape tension sensor 22 and which controls the tape tension in this span of the record carrier by influencing the drag. In the RECORDING or PLAYBACK mode the control device 10 therefore closes a switch 27, which connects the motor 18, which is coupled to the reel 1 via the winding spindle 17, to a control circuit 28. The circuit 28 supplies such a current to the motor that it has a braking effect on the record carrier which is pulled off the reel 1 and passed along the tape guide 23 of the tape tension sensor 22. In order to generate the current which is fed to the motor 18, the control circuit 28 includes an operational amplifier 29, whose output 30 can be connected to the motor 18 via the switch 27. An input 31 of this operational amplifier receives a reference voltage taken from a voltage divider 32, which voltage is a measure of the desired tape tension to be established. In the operational amplifier 29 this reference voltage is compared with a signal voltage which is applied to the second input 33 and which is a measure of the actual tape tension, thus providing the control quantity which is fed to the motor 18 and which is available on output 30 of the operational amplifier 29.

The signal voltage, which is a measure of the instantaneous tape tension and which is applied to the input 33 of the operational amplifier 29, is derived from an oscillator 34. For this purpose the signal voltage appearing on output 35 of the oscillator 34 is applied to a single coil 36 and the signal voltage appearing across this coil is rectified by a rectifier circuit 37, whose output voltage is applied to the input 33 of the operational amplifier 29. A metal part 38, which is connected to the tape-tension sensor 22, co-operates with the coil 36 to determine the amplitude of the signal voltage. The part 38 is designed as a damping element for the coil 36, so that depending on the displacement of the tape-tension sensor 22 the quality factor or Q of the coil 36 is essentially variable. In the present embodiment the coil 36 is a hollow coil and the metal part 38 is constituted by a plunger made of a material which exhibits eddy current and/or hysteresis losses and which penetrates the coil over a length which depends on the displacement of the tape-tension sensor. In this way the instantaneous tape tension is converted into a coil damping which is proportional thereto. When the damping of the coil 36 changes, the quality factor will also change, as a result of which the amplitude of the signal voltage across the coil, applied by oscillator 34, will also change. Therefore the amplitude of the signal voltage appearing across the coil 36 is a measure of the instantaneous tape tension. After rectification of this signal voltage by means of the rectifier circuit 37 this yields a signal voltage in the form of a varying direct voltage which is proportional to the tape tension. To obtain the corresponding control quantity, the rectified voltage is compared with the reference voltage, derived from the voltage divider 32, in the operational amplifier 29.

Of course, it is not strictly necessary that the signal voltage appearing across the coil 36, whose amplitude corresponds to the instantaneous tape tension, is rectified in a rectifier circuit 37 and is applied to the control circuit 28 in this form. There are various possibilities of evaluating this a.c. signal voltage of varying amplitude in the control circuit. For example, the signal voltage may be compared directly with a direct voltage constituting the reference signal, in which case pulses of variable width for feeding the motor 18 are derived from the phase lead of one half-wave of the alternating voltage, which is proportional to the instantaneous amplitude, causing a corresponding drag on the record carrier 3.

In the embodiment of FIG. 1, it is preferred that the plunger 38 is made of sheet-iron and is strip-shaped. By the use of sheet-iron both the eddy-current losses and hysteresis losses are employed for damping the coil 36, so that a particularly effective conversion of the displacement of the tape-tension sensor 22 into an amplitude variation of the signal voltage across the coil is obtained. In this embodiment the tape-tension sensor 22 furthermore comprises a support 39, which is also made of sheet-iron, so that this support 39 together with the sheet-iron plunger 3 can be manufactured in one piece, which results in a very simple construction. As is apparent from FIG. 1, a deformable region 40 is formed between the support 39 and the plunger 38, by means of which the position of the plunger 38 relative to the coil 36 is simply adjustable by deformation during manufacture, so that correct co-operation of the two parts is guaranteed. If desired, such a plunger 38 may for example also be made of copper sheet, in which case the eddy-curent losses occurring therein are utilized for damping the coil.

Figure 2:
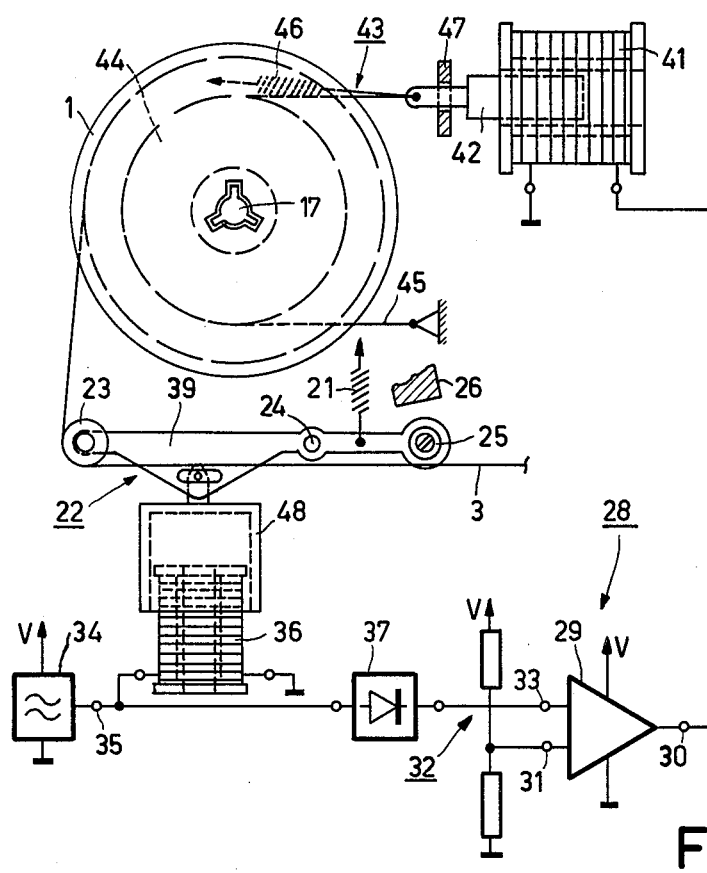
FIG. 2 is a view similar to FIG. 1 of a different embodiment of the invention, having a hollow cylinder of a material with a good electrical conductivity for damping the coil.

The embodiment of FIG. 2 again uses a single coil 36, which is energized with a signal voltage from an oscillator 34, the signal voltage across the coil 36, which varies proportionally to the instantaneous tape tension, being rectified by a rectifier circuit 37 and being applied to the input 33 of the operational amplitude 29. The other input 31 of the operational amplifier 29 again receives a reference voltage formed by means of a voltage divider 32, so that by comparison of the voltages applied to the two inputs of the operational amplifier a control quantity for stabilizing the tape tension is available on output 30 of said amplifier. Here, this control quantity is applied to a solenoid 41, which co-operates with a plunger armature 42 to actuate a band brake 43. This band brake comprises a braking disk 44, which is connected to the winding spindle 17, around which disk a brake band 45 is arranged, of which one end is secured to the apparatus and of which the other end is connected to the plunger armature 42. A spring 46 which acts on the plunger armature 42 tends to position said armature against a stop 47, in which case the band brake 43 is released. If upon energization of the solenoid 41 with the control quantity the plunger armature 42 is drawn into the solenoid over a greater or smaller length, the band brake 43 will exert a corresponding braking action, so that the tape tension of the record carrier 3 being unwound from the reel 1 is unaffacted. As a result of the change in tension, the sensor 22 will assume a position in accordance with the instantaneous tape tension.

In this case a metal part 48 is articulated to the support 39 of the tape-tension sensor 22, which part consists of a material with a good electrical conductivity, for example copper, which takes the form of a hollow cylinder, and which surrounds the coil 3 over a greater or a smaller part depending on the displacement of the tape-tension sensor. In this way the hollow cylindrical portion of the metal part 48 constitutes a short-circuit ring for the coil 36, which portion surrounds said coil over a greater or smaller part, which results in a corresponding variation of the quality factor of the coil and thus of the coil damping. As a result of such a change of the coil damping the amplitude of the signal voltage across the coil will change accordingly, so that by means of the single coil again a signal which is proportional to the instantaneous tape tension is obtained for further processing in the control circuit 28.

Figure 3:
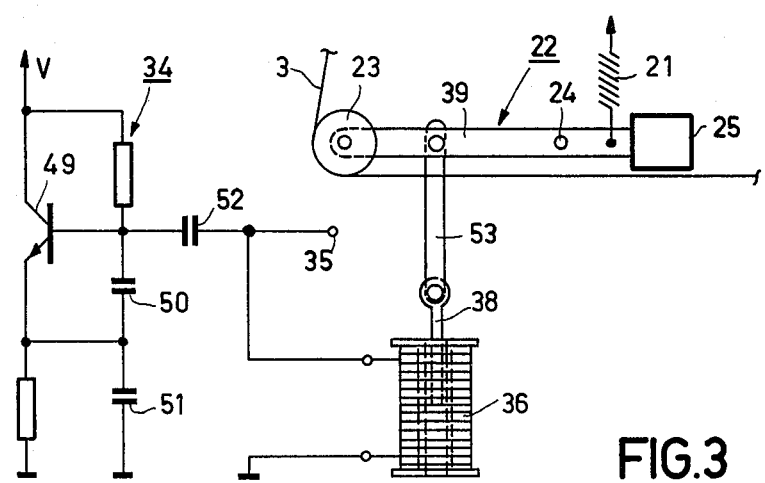
FIG. 3 is an electrical schematic and mechanical diagram of a third embodiment in which the coil is included in the oscillator as a circuit element which also determines its resonant frequency.

In the embodiment of FIG. 3 the coil 36 is directly included in the oscillator 34 as a circuit element which also determines its resonant frequency. The oscillator 34 comprises a transistor 49, which is arranged in common collector arrangement and which is excited by means of a Colpitts circuit. For this purpose the base circuit of the transistor 49 includes a capacitive voltage divider comprising two capacitors 50 and 51, whose junction point is connected to the emitter of the transistor 49 and to which the coil 36 is connected in parallel via an isolating capacitor 52. The junction point of the isolating capacitor 52 and the coil 36 at the same time constitutes the output 35 of the oscillator 34, the signal voltage generated by said oscillator being available across the coil 36. The capacitors 50 and 51 and the coil 36 then are the circuit elements which determine the resonant frequency of the oscillator. Obviously, it is also possible to employ any other known self-starting circuit comprising a coil for the oscillator.

Again a metal part 38 penetrates into the coil 36, which part is articulated to the support 39 of the tape-tension sensor 22 via an arm 53. The penetration depth of the metal part 38 in the coil 36 then depends on the position of the sensor lever 22, which is determined by the instantaneous tape tension. Depending on its penetration depth in the coil 36, the metal part 38 thus produces a variable damping of the coil. The output 35 of the circuit thus is a signal voltage whose amplitude varies depending on the tape tension, which voltage is then applied to the further control cirucit 28, which for simplicity is not shown, in a similar way as in the embodiment of FIG. 1 or FIG. 2.

It is evident that in the FIG. 3 embodiment no separate coil is required for the oscillator 34, so that such an arrangement is extremely simple. This embodiment takes advantage of the fact that a change in damping of a coil only produces a comparatively small variation of its inductance, so that the resonant frequency of the oscillator does not change significantly if the tape tension and thus the damping of the coil 36 varies. A more or less constant frequency of the signal to be processed has the advantage that no undesired frequency dependences can occur in the control circuit and this frequency can be selected so that no annoying interference is possible with other oscillator signals in the apparatus, for example the erase and/or bias signal or a pilot tone signal.

As is evident from the description of the foregoing embodiments, several modifications are possible within the scope of the invention. This is in particular so in respect of the manner in which the single coil, used for generating a signal which is proportional to the tape tension, is damped by means of the tape-tension sensor and the signal voltage of variable amplitude which appears across the coil, is converted in the control circuit and via said circuit is converted into a corresponding variation of the tape tension.

What is claimed is:

1. A device for controlling tension in an elongated article arranged along a path, comprising:
   a source of biasing force,
   a tension sensor responsive to tension in the article, moveable against the biasing force,
   means for generating an electrical signal corresponding to the position of said sensor, and
   a control circuit and tension control responsive to said electrical signal for influencing the tension in the article,
   characterized in that said means for generating an electrical signal comprise a metal part and a single coil only, the metal part comprising a damping element for the coil so as to vary the quality factor of the coil by movement of the metal part responsive to movement of the sensor.

2. A device as claimed in claim 1, characterized in that said single coil is a hollow coil and the metal part is a plunger formed of a material exhibiting eddy current and/or hysteresis losses, the plunger being arranged to penetrate into the coil over a length dependent on the movement of the tape-tension sensor.

3. A device as claimed in claim 2, characterized in that the plunger is made of sheet iron and is strip-shaped.

4. A device as claimed in claim 3, characterized in that the tension sensor comprises a support made of sheet iron, integral with the plunger and having a deformable region formed between the support and the plunger, by which the position of the plunger relative to the coil is adjustable by deformation.

5. A device as claimed in claim 1, characterized in that the metal part consists of a material having good electrical conductivity, formed as a hollow cylinder and arranged to surround the coil for a greater or lesser distance depending upon the movement of the tension sensor.

6. A device as claimed in claim 1, 2, 3, 4 or 5, characterized in that the coil is a circuit element in an oscillator, the coil determining the resonant frequency of the oscillator, whereby an electrical signal of essentially constant frequency but varying amplitude can be produced using only one coil.

7. A recording and/or reproducing apparatus for a record carrier in the form of a tape, comprising:
  a source of biasing force,
  a tape-tension sensor having a tape guide moveable against said biasing force along which the record carrier tape is passed, the sensor further comprising at least one coil and a metal part which cooperates with said coil,
  an oscillator for energizing said at least one coil so as to produce a signal voltage, the amplitude of the signal voltage being a measure of the tape tension, and
  a tape-tension control including a control circuit, for influencing the tape tension, said signal voltage being applied to said control circuit,
  characterized in that said sensor comprises a single coil only, and that the metal part comprises a damping element for the coil which varies the quality factor of the coil by movement of the metal part responsive to movement of the tape guide.

8. An apparatus as claimed in claim 7, characterized in that said single coil is a hollow coil and the metal part is a plunger formed of a material exhibitng eddy current and/or hysteresis losses, said plunger penetrating into the coil over a length dependent on the movement of the tape guide.

9. An apparatus as claimed in claim 8, characterized in that the plunger is made of sheet iron and is strip-shaped.

10. An apparatus as claimed in claim 9, characterized in that the tape-tension sensor comprises a support made of sheet iron and formed integral with the plunger.

11. An apparatus as claimed in claim 10, characterized in that the support and plunger are connected by a deformable region, by which the position of the plunger relative to the coil may be adjusted.

12. An apparatus as claimed in claim 7, characterized in that the metal part is formed of a material having good electrical conductivity and shaped as a hollow cylinder surrounding the coil for a greater or smaller distance depending on the movement of the tape guide.

13. An apparatus as claimed in any one of claims 7–12, characterized in that said single coil is a circuit element in said oscillator which determines the oscillator resonant frequency.

* * * * *